United States Patent [19]
Shepard

[11] Patent Number: 5,683,181
[45] Date of Patent: Nov. 4, 1997

[54] METHOD AND APPARATUS FOR ENHANCING THERMAL WAVE IMAGING OF REFLECTIVE LOW-EMISSIVITY SOLIDS

[75] Inventor: Steven M. Shepard, Southfield, Mich.

[73] Assignee: Thermal Wave Imaging, Inc., Lathrup Village, Mich.

[21] Appl. No.: 439,588

[22] Filed: May 12, 1995

[51] Int. Cl.[6] .............................. G01K 7/00; G01K 7/36
[52] U.S. Cl. .......................................... 374/165; 374/126
[58] Field of Search ................................... 374/126, 165, 374/120, 121, 9; 250/341.6

[56] References Cited

U.S. PATENT DOCUMENTS

| | | | |
|---|---|---|---|
| 4,091,673 | 5/1978 | Tamura et al. | 374/120 |
| 4,265,117 | 5/1981 | Thoma et al. | 374/165 X |
| 4,408,903 | 10/1983 | Baldasarri | 374/126 X |
| 4,996,426 | 2/1991 | Cielo et al. | 250/330 |

Primary Examiner—Richard Chilcot
Assistant Examiner—Joseph L. Felber

[57] ABSTRACT

An embodiment of an apparatus for enhancing remote infrared (IR) temperature measurement of a low-emissivity sample includes a flexible membrane of a high-emissivity material for converting thermal energy from the sample into IR energy, an enclosed shroud, an IR camera, a light source, and at least one fan. The membrane is coupled to the enclosed shroud at one end of the shroud for supporting the membrane. The shroud includes at least four walls and an end wall opposite the membrane to define an interior space. The end wall includes an imaging window formed therethrough for accommodating the IR camera, which is provided for detecting IR energy radiated from the membrane. The light source is disposed in the interior space and mounted to the shroud for illuminating the membrane. The fan is disposed in an aperture formed in the end wall and is provided for generating an airflow into the interior space onto the membrane to thereby apply a force against the membrane to move the membrane in a direction so that a predetermined surface area of a sample positioned adjacent to the apparatus is contacted by the membrane.

19 Claims, 1 Drawing Sheet

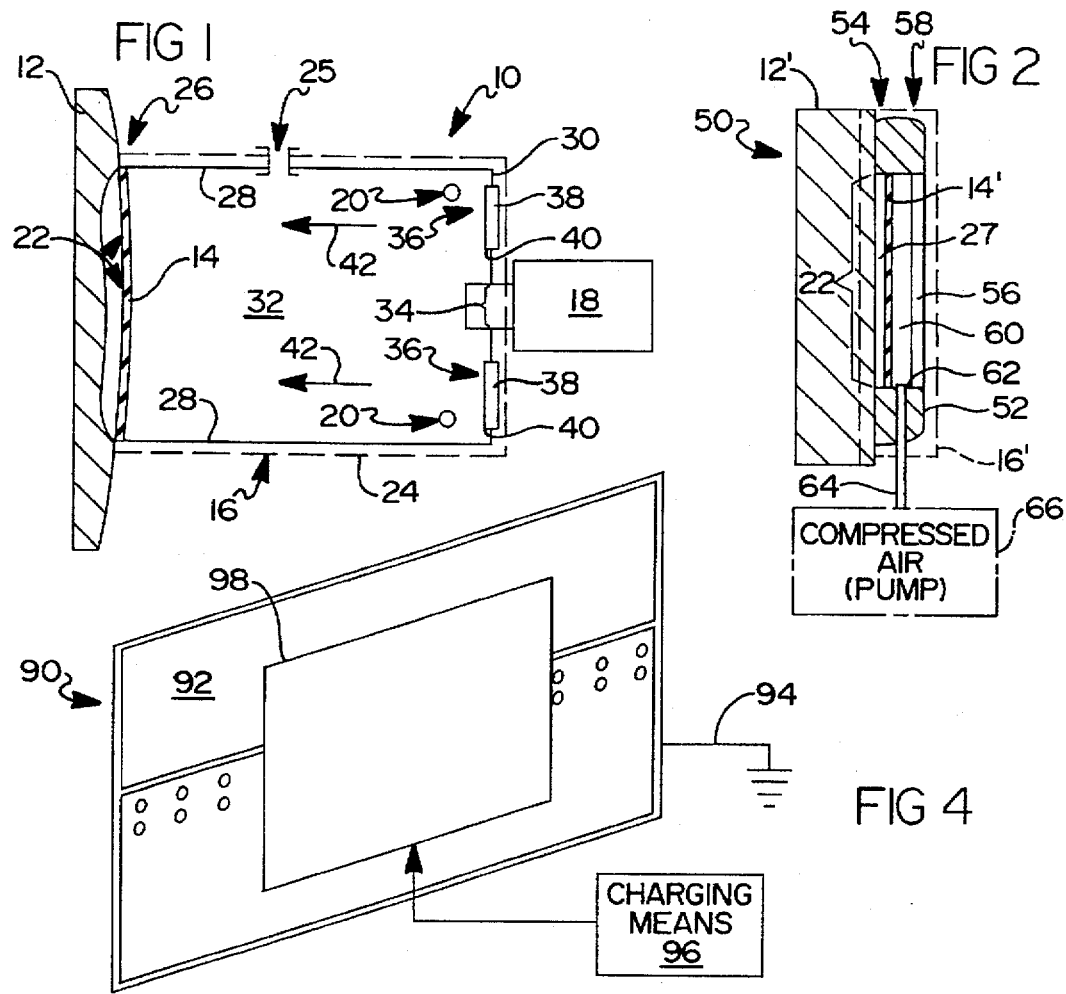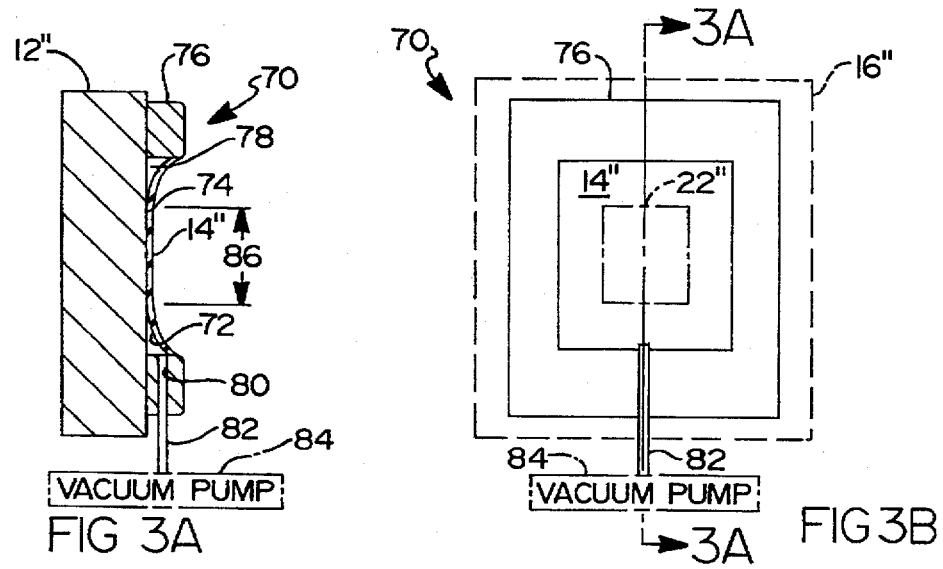

METHOD AND APPARATUS FOR ENHANCING THERMAL WAVE IMAGING OF REFLECTIVE LOW-EMISSIVITY SOLIDS

TECHNICAL FIELD

The present invention relates generally to a method and apparatus for enhancing thermal wave imaging and, more particularly, to a method and apparatus for enhancing thermal wave imaging of reflective, low-emissivity solids.

BACKGROUND OF THE INVENTION

Remote infrared (IR) temperature measurement for non-destructive testing (NDT) has been under investigation for some time, which has led to the development of various techniques, known alternatively as thermal imaging, thermography, IR imaging, thermal wave imaging, and time resolved IR imaging. One on-going problem in the art relates to materials having highly reflective surfaces. Materials of this type are difficult, if not impossible, to image in the IR spectrum at room temperature. This problem is due to corresponding low IR emissivities of the material's surface, which neither absorb nor emit IR energy.

One solution practiced in the art is to prepare the surface of these low IR emissivity materials with a relatively high-emissivity coating, such as black paint or contact paper, to allow the surface to be imaged in the IR spectrum. For those techniques mentioned above where the material is actively heated with an optical source, the high-emissivity coating serves to increase light absorption into the sample bulk, as well as increase IR radiation due to the subsequent surface temperature increase. The above-described solution has not proven to be entirely satisfactory, since, in many applications, such surface preparation is either undesirable or impossible (i.e., may contaminate or delay further processing of the component under test).

Accordingly, there is a need to provide an improved method and apparatus for enhancing thermal wave imaging that minimizes or eliminates one or more of the problems as set forth above.

SUMMARY OF THE INVENTION

This invention provides an apparatus and a method that eliminates the necessity for surface preparation when IR imaging materials having a highly reflective, low-emissivity surface. An apparatus in accordance with this invention includes a flexible membrane of a high-emissivity material for converting thermal energy from the imaged sample into IR energy, and a means for selectively attracting said membrane against the sample by applying a force against said membrane to move said membrane in a direction so that a portion of a sample positioned adjacent to said membrane is contacted by the membrane. The advantages of such an apparatus are immediately applicable when using techniques such as thermal wave imaging, where the sample under test is optically heated with, for example, pulsed flashed lamps, or heat lamps, since the membrane can be quickly and completely separated from the sample (thus no contamination and delay) by simply deselecting the attracting means, thus removing the applied force.

In a preferred embodiment, the flexible membrane is made from a polyethylene terepthalate polyester film (hereinafter Mylar™) or from an elastomer impregnated with conductors. The attracting means takes the form of an enclosed shroud coupled to the membrane at one end. The shroud has at least four walls and an end wall opposite the membrane to define an interior space. The second end wall has an imaging window (or aperture) formed therethrough for accommodating an IR detection means, preferably an IR camera. The attracting means further includes at least one fan disposed in an aperture formed in the end wall for generating an air flow into the interior onto the membrane to move the membrane into contact with the sample. The apparatus further includes illumination means disposed in the interior of the shroud and mounted to the shroud for illuminating the membrane, which may be a simple flash lamp. The preferred embodiment is particularly useful for thermal wave imaging applications, where optical sources are used to heat the sample, since the light source, IR detection means, and the membrane are housed in a single enclosed shroud. In particular, reflections from light sources after they are shut-off are reduced since the membrane material is non-reflective. Further, safety of personnel in the inspection area is increased, since the membrane material, which is either opaque or semi-opaque, prevents direct viewing of the illumination source.

In another embodiment, the attracting means takes the form of a gasket coupled to the membrane at a first end. The gasket includes an imaging window of a material transparent to IR energy, preferably quartz, disposed at a second end opposite the first end for allowing transmission of IR radiation to an IR detector. The membrane, imaging window and gasket combine to define an air tight interior space of the apparatus. The gasket includes a passage formed therethrough and leading to the interior for introducing pressurized fluid from a pump into the interior. The pressurized fluid in the interior bears against the membrane (i.e., applies a relative force thereto) to move the membrane into contact with, or adjacent to the sample. Preferably, the fluid is air or some inert gas. Preferably a fluid (such as water, ethylene glycol, or the like) may be placed between the membrane and the sample to optimize energy coupling between the membrane and sample. Heating and subsequent imaging then occur through the imaging window.

In a third embodiment, the attracting means takes the form of a vacuum gasket coupled to the membrane and which is conformable to the sample surface. An inner side of the membrane (i.e., the side facing the sample), an inner portion of the gasket, and the surface of the sample enclosed or covered by the gasket perimeter when the gasket contacts the sample defines an airtight chamber. The vacuum gasket further includes a passage formed therethrough to the chamber for the withdrawal of gas from the chamber using a vacuum pump to create a vacuum in the chamber. The resulting force applied to the membrane moves the membrane into contact with the sample.

In a fourth embodiment, the attracting means, includes a grounding circuit for grounding the sample, and a charging means for applying an electrostatic charge to the membrane. The electrostatic force induced thereby causes the membrane to be drawn to and into contact with, or adjacent to, the sample.

In a second aspect of this invention, a method of remote infrared temperature measurement of a low-emissivity sample using a high-emissivity membrane is provided. The method includes four basic steps. The first step includes applying a force to the membrane to move the membrane into contact with a portion of the sample. The second step includes irradiating the membrane with electromagnetic energy to heat the portion of the sample so as to increase the temperature of the irradiated portion of the sample. The third step includes detecting IR radiation emanating from the membrane due to the temperature increase of the irradiated portion of the sample. The fourth step includes discontinuing the force applied in the first step to allow removal of the membrane from the sample. Thus, rather than viewing the sample surface directly, an infrared (IR) imager views the membrane material instead, which is in contact with the sample surface. Since the membrane is thin and thermally conductive, it closely follows the surface temperature changes in the sample, which can be detected by the IR imager since the membrane's IR emissivity is higher than that of the low-emissivity surface of the sample. Relatively quick and complete removal of the membrane follows from simply discontinuing the applied force, which provides significant advantages over conventional, relatively permanent surface preparations used in the prior art.

These and other features and objects of this invention will become apparent to one skilled in the art from the following detailed description and the accompanying drawings illustrating features of this invention by way of example.

BRIEF DESCRIPTION OF THE DRAWINGS

FIG. 1 is a partial diagrammatic sectional side view of an enclosed shroud embodiment of the present invention.

FIG. 2 is a partial diagrammatic sectional side view a compressed air embodiment in accordance with the present invention.

FIG. 3A is a partial diagrammatic sectional view taken substantially along lines 3A—3A of FIG. 3B depicting a vacuum embodiment in accordance with the present invention.

FIG. 3B is a partial diagrammatic front view of the vacuum embodiment shown in FIG. 3A.

FIG. 4 is a partial diagrammatic view of an electrostatic force embodiment in accordance with the present invention.

DETAILED DESCRIPTION OF THE PREFERRED EMBODIMENTS

Referring now to the drawings wherein like reference numerals are used to reference identical components in various views, FIG. 1 depicts an enclosed shroud apparatus 10 for enhancing infrared (IR) imaging of sample 12 having a reflective, low-emissivity surface. Apparatus 10, a preferred embodiment of the present invention, includes a high-emissivity membrane 14, means 16 for selectively attracting said membrane against the sample 12, IR detection means 18, and illumination means 20. Apparatus 10 is adapted so that a predetermined surface area 22 of sample 12 may be imaged by IR detection means 18.

The presence of membrane 14 accomplishes two purposes—firstly, it serves to increase light absorption into the sample, and secondly it increases IR radiation due to the subsequent surface temperature increase (i.e., acts as a transducer). This temperature increase is detectable by IR detection means 18 at a location remote from the surface 22. Membrane 14 is generally flexible and thermally conductive. Membrane 14 may be constructed from a material that is either continuous or woven (e.g., a fabric), and may contain embedded conductive particles or fibers. Preferably, membrane 14 is an elastomer impregnated with conductors, or alternatively, Mylar™. Preferably, the Mylar™ will have the following properties:

1) Thickness: approximately 1–5 mil.;
2) Emissivity: greater than or equal to 0.9.

Currently, some useable products include:
1) BEROQUIST QPAD 3 (Graphite in polymer matrix), 5300 Edina Industrial Blvd, Minneapolis, Minn. 55439; and 2) SARCON HR (ceramic impregnated rubber pad), Fujipoly America Corp, 365 Carnegie Ave., Rentworth, N.J. 07033.

It should be appreciated that, rather than directly viewing the IR emission from surface 22 of sample 12, IR detection means 18 views the IR emission from membrane 14 instead, which is in contact with surface 22. Since membrane 14 is relatively thin and thermally conductive, its temperature closely follows changes in the temperature of surface 22 of sample 12. The surface of membrane 14 can be more easily viewed by IR detection means 18 since its IR emissivity is higher than that of reflective, low-emissivity sample 12.

Attracting means 16 is coupled to membrane 14 and is provided for moving or attracting membrane 14 into contact with sample 12. Attracting means 16 includes an enclosed shroud 24, a first end 26, sidewalls 28, end wall 30, interior 32, imaging window 34, and means 36 for applying a force against membrane 14, which includes at least one fan 38 disposed in a respective aperture 40.

Referring to FIG. 1, shroud 24 is coupled to membrane 14 at first end 26 for supporting and retaining membrane 14, shroud 24 having at least four sidewalls 28 and an end wall 30 disposed opposite first end 26 to define interior 32. The inner side of walls 28 are preferably highly reflective, and configured to direct light from illumination means 20 onto membrane 14. End wall 30 includes imaging window 34 formed therethrough for accommodating IR detection means 18.

Preferably, endwall 30 is constructed from polished aluminum although other materials having high reflectivity are also suitable.

If membrane 14 were simply laid against the sample surface by shroud 24 many inaccuracies would result due to nonuniform thermal contact between the sample and the membrane (e.g., due to the presence of air bubbles). Accordingly, attracting means 16 of the present invention includes means 36 for selectively applying a force against membrane 14 to move membrane 14 in a direction so that the predetermined surface area 22 of sample 12, positioned adjacent membrane 14, is uniformly engaged or contacted thereby. Thus, force applying means 36 is provided for actively holding membrane 14 against surface 22. Force applying means includes fans 38 disposed in aperture 40 formed in end wall 30 for generating an airflow 42 into interior 32 onto membrane 14 to move membrane 14 as described above. Fans 38 may be selected or deselected for operation using, for example, a simple switch (not shown) between the fan and a power source. It should be appreciated that fans 38 assure surface contact of membrane 14 with surface 22 of sample 12.

Preferably, shroud 24 is not airtight, since it is not desirable to trap heat within shroud 24. Accordingly, vent 25 is provided for air to escape from shroud 24. The cross sectional opening of vent 25 is preferably adjustable to adjust the air pressure on membrane 14. Thus the system can accommodate the different flexibility characteristics of different membrane materials.

IR detection means 18 is provided for detecting IR energy emanating from membrane 14. Preferably, IR detection means is an IR camera.

Illumination means 20 are disposed in interior 32 and mounted to shroud 24 for illuminating membrane 14. Illumination means 20 may take the form of pulsed flash lamps, or heat lamps having a controlled and predetermined on-time.

Preferably, illumination means 20 has the following characteristics:

1) Wavelengths: either 2–5 micron or 8–12 micron;
2) Bandwidth: min 30 Hz (frame rate);
3) Duration: less than 1 video frame (preferably in the 1 millisecond range).

For thermal wave imaging applications, where optical sources are used to heat sample 12, the use of apparatus 10 as described above offers advantages over conventional practice, since membrane 14 (i.e., the transducer material), the IR camera 18, and illumination means 20 are all housed in shroud 24. In particular, two distinct advantages are immediately evident: (a) reflections are reduced (after illumination has been discontinued) since membrane 14 is of a material that is substantially non-reflective, and (b) the safety of personnel in the inspection area is increased, since membrane 14 and shroud (which is preferably opaque), which is, in general terms, either opaque or semi-opaque, and shroud (which is preferably opaque) prevents direct viewing of illumination means 20.

In operation, a method of remote IR temperature measurement using apparatus 10 is implemented as follows. First, a force is applied to membrane 14 by generating an airflow 42 using fans 38 through aperture 40 into interior 32 onto membrane 14 to move the membrane into contact with predetermined surface area 22. Next, membrane 14 is irradiated with electromagnetic energy from illumination means 20 to heat the predetermined surface area 22 thereby increasing the temperature of the sample in the predetermined surface area 22. Third, radiation is detected emanating from membrane 14 due to the surface area temperature increase. Finally, discontinuing the applied force by discontinuing airflow 42 to allow removal of the membrane from the sample. Through use of the above method, undesirable surface preparation (e.g., black paint or contact paper) required by conventional methods is avoided. Furthermore, since apparatus 10 allows selective application of force to membrane 14, with relatively fast removal of membrane 14 from contact with sample 12, no delay is incurred if further processing of sample 12 is desired.

FIG. 2 shows apparatus 50, a compressed air embodiment of the present invention for enhancing thermal imaging of a high reflectance, low-emissivity surface 22' of sample 12'. Apparatus 50 includes a high-emissivity membrane 14' of a material identical to that described above, and means 16' for attracting membrane 14' against sample 12'. In this embodiment, IR detection means and illumination means are not integral with apparatus 50, and are thus not illustrated in FIG. 2.

Attracting means 16' includes gasket 52 coupled to membrane 14' at a first end 54 for supporting and retaining membrane 14'. Casket 52 includes an imaging window 56 of a material transparent to IR energy disposed at a second end 58 opposite first end 54. Imaging window 56 is provided for transmission of IR radiation to a remote IR detection means (not illustrated in FIG. 2). Imaging window 56 may be made from, for example, quartz. Membrane 14', imaging window 56, and gasket 52 define an airtight interior 60.

As with apparatus 10, attracting means 16' of apparatus 50 includes means for applying a force against membrane 14', which includes a passage 62 formed through gasket 52 to interior 60 for introducing pressurized fluid through a hose 64 disposed in passage 62 from a pump 66. The pressurized fluid in interior 60 bears against membrane 14' to move or attract membrane 14' against sample 12'. In this embodiment, the fluid used is preferably gaseous air or inert gas. Preferably a liquid 27 (such as water, ethylene glycol or the like) is placed between membrane 14' and sample 12 to enhance the energy coupling between the two materials. The attractive force between membrane 14' and sample 12 may be selected or deselected by controlling communication between chamber 60 and a fluid sump (not shown) by way of, for example, valve means (not shown) in pump 66 to equalize a pressure differential across membrane 14'.

In operation, a method of remote IR temperature measurement using apparatus 50 is identical to that described above, except that the initial step of applying a force against the membrane 14' is performed by introducing pressurized fluid through passage 62 into interior 60 such that the pressurized fluid bears against membrane 14', which moves or attracts membrane 14' into contact with the predetermined surface area 22' of sample 12'.

FIGS. 3A and 3B depict apparatus 70, a vacuum embodiment of the present invention for imaging a low-emissivity sample 12". Apparatus 70 includes a high-emissivity membrane 14" of a material identical to that described above, means 16" for attracting membrane 14" against sample 12", which functions identically to that described above. Apparatus 70 is used in conjunction with an IR detection means and an illumination means, but which are not integral with apparatus 70, and are therefore not illustrated in FIGS. 3A, and 3B.

As shown in FIG. 3A, membrane 14" includes an inner side 72 for contacting sample 12", and an outer side 74 for emitting IR energy detectable by a remote IR detection means. Attracting means 16" includes a vacuum gasket 76 coupled to membrane 14" and which is conformable (over range 86) to the sample and functions, in part, to support and retain membrane 14".

An inner portion of gasket 76, inner side 72, and the surface of sample 12" combine to define an airtight chamber 78 when gasket 76 contacts sample 12".

In this embodiment, attracting means 16" also includes means for applying a force against membrane 14", which includes a passage 80 formed through gasket 76 to chamber 78 for withdrawal of gas from chamber 78 through hose 82. This evacuation, which is accomplished through the use of a vacuum pump 84, creates a vacuum in chamber 78 to thereby move or attract membrane 14" into contact with sample 12". The area to be imaged is noted as 22" and is the central area where full contact between membrane 14 and sample 12" occurs. The attractive force can be selected or deselected by controlling fluid communication between chamber 78 and atmosphere by, for example, valve means (not shown) in pump 84.

In operation, a method of remote IR temperature measurement using apparatus 70 is identical to that described above, except that the initial step of applying a force to the membrane is performed by withdrawing gas through passage 80 from chamber 78 to create a vacuum in the chamber; the induced vacuum pulling or attracting membrane 14" onto sample 12".

Also acceptable materials for use as membrane 14 include IR transparent materials which are typically used for vacuum bagging in the manufacture of composite materials. These bagging materials are thin (approximately 0.002 inches), and can be placed in thermal contact with the surface of sample 12 (without the formation of bubbles) by using vacuum pressure or forced air. This is how these materials are typically used in composite manufacture. Because these materials are not inherently emissive, it is preferable to paint the outside surface nearest the IR camera black. The chemical composition of the paint is not critical, however, superior results are obtained by using a paint having a flat finish and the paint layer should not be excessively thick.

Using this infrared transparent material, is conceptually somewhat different than the doped elastomeric material heretofore used to describe the first embodiment of the invention in conjunction with FIGS. 1–3. In the membrane of the first embodiment, the heat energy is conducted through the membrane and the temperature at the surface is detected by an IR camera. In this second embodiment, the IR energy is radiated from the sample surface, and travels through the IR transparent bagging film. It is then absorbed and reradiated by the paint on the film surface. Because the heat dissipation in the elastomeric material (the "high" conductivities of these materials are orders of magnitude lower than metal conductors) is much more significant than the small IR transmission losses in the film, and the films are much thinner than the elastomeric materials, this approach of the second embodiment is more efficient and should yield a stronger signal than the approach set forth in the first embodiment. Air Tech International, 2542 East Del Amo Blvd., Carson, Calif. 90749 (310)603-9683 is a supplier of nylon bagging materials which are transparent to IR radiation. These materials are sold under the following trade names:

IPPLON BW 900
WRIGHTLON 8500
STRETCHLON 700

Also available through Air Tech International are vacuum bag, sealant tapes sold under the following trade names:

GS-213
AT-200Y
GS-2
GS-95

FIG. 4 depicts apparatus 90, a further embodiment of the present invention. In this embodiment, sample 92 is grounded through a grounding circuit 94, while a charging means 96 is provided for creating a charged membrane 98. Thus, means for attracting membrane 98 against sample 92 comprises, in this embodiment, a charging means 96 and a grounding circuit 94. The induced electrostatic force between charged membrane 98 and grounded sample 92 provides the means for attracting and actively holding the membrane 98 against sample 92. Opening or closing the grounding circuit 94 provides a means for selecting or deselecting the attractive force described above.

In operation, a method of remote IR temperature measurement using apparatus 90 is identical to that described above except that the initial step of applying a force to the membrane is performed by the substeps of bringing the sample to a ground potential, and electrostatically charging the membrane to induce an attractive force between membrane 98 and sample 92 to move or attract membrane 98 into uniform contact with a predetermined surface area of sample 92 (i.e., 22").

The advantages of the method and apparatus of the present invention include the ability for temporarily enhancing the ability of the sample under test to absorb or emit IR energy. In contrast to conventional methods and systems, an embodiment in accordance with the present invention does not undesirably contaminate the surface of the sample nor delay further processing of the sample itself.

The preceding description is exemplary rather than limiting in nature. A preferred embodiment, and other embodiments, has been disclosed to enable one skilled in the art to practice this invention. In particular, several methods and corresponding apparatus have been disclosed for actively, but temporarily, holding a membrane against a high-reflectance sample by applying a force to the membrane, either mechanically, by using air pressure or by an induced vacuum, electrostatically, or with a coupling fluid, such as water or ethylene glycol such that the surface tension of the couplant holds the membrane in place. It is contemplated that there are a plurality of alternative methods and corresponding apparatus. Variations and modifications are possible without departing from the purview and spirit of this invention; the scope of which is limited only by the appended claims.

What is claimed is:

1. An apparatus for enhancing remote infrared (IR) temperature measurement of a low-emissivity sample, comprising:

a flexible membrane having high emissivity properties of a high-emissivity material for converting thermal energy from the sample into IR energy detectable by a remote IR detection means;

means for selectively attracting said membrane adjacent the sample, wherein said attracting means includes an enclosed shroud coupled to said membrane at a first end for retaining and supporting said membrane, said shroud having at least four walls, an end wall disposed at a second and opposite said first end to define an interior, said end wall having an imaging window formed therethrough for accommodating the IR detection means, and, a fan disposed in an aperture formed in said end wall for generating an airflow into said interior onto said membrane to thereby attract said membrane against the sample; and wherein said apparatus further comprises illumination means disposed in said interior and mounted to said shroud for illuminating said membrane.

2. The apparatus of claim 1 wherein said material is an elastomer impregnated with conductors.

3. The apparatus of claim 1 wherein said material is a polyethylene terepthalate polyester film.

4. The apparatus of claim 1, wherein said flexible membrane is comprised of an elastomeric material which is inherently emissive.

5. The apparatus of claim 1, wherein said flexible membrane is comprised of a first layer of inherently non-emissive material coated with a second layer of material which is inherently emissive.

6. An apparatus for enhancing remote infrared (IR) temperature measurement of a low-emissivity sample, comprising:

a flexible membrane having high emissivity properties of a high-emissivity material for converting thermal energy from the sample into IR energy detectable by a remote IR detection means;

means for selectively attracting said membrane adjacent the sample, wherein said attracting means includes a gasket coupled to said membrane at a first end for supporting and retaining said membrane, said gasket having an imaging window of a material transparent to IR energy disposed at a second end opposite said first end for transmission of infrared (IR) radiation to the remote IR detection means, said membrane, imaging window and gasket defining an airtight interior, said gasket further having a passage formed therethrough to said interior for introducing pressurized fluid into said interior wherein pressurized fluid in said interior bears against said membrane to thereby attract said membrane against the sample.

7. The apparatus of claim 6 wherein said fluid is a gas.

8. The apparatus of claim 6, further including a liquid residing between said sample and said membrane.

9. The apparatus of claim 8 wherein said liquid is selected from the group consisting of water and ethylene glycol.

10. An apparatus for enhancing remote infrared (IR) temperature measurement of a low-emissivity sample, comprising:

a flexible membrane having high emissivity properties of a high-emissivity material for converting thermal energy from the sample into IR energy detectable by a remote IR detection means;

means for selectively attracting said membrane adjacent the sample, wherein said membrane has an inner side for contacting the sample and an outer side for emitting IR energy detectable by the IR detection means, and wherein said attracting means comprises a vacuum gasket coupled to said membrane and conformable to the sample for supporting and retaining said membrane, an inner portion of said gasket, said inner side of said membrane, and the sample defining an airtight chamber when said vacuum gasket contacts the sample, said vacuum gasket further having a passage formed therethrough to said chamber for withdrawal of gas from said chamber using a vacuum pump to create a vacuum in said chamber to thereby attract said membrane against the sample.

11. An apparatus for enhancing remote infrared (IR) temperature measurement of a low-emissivity sample, comprising:

a flexible membrane having high emissivity properties of a high-emissivity material for converting thermal energy from the sample into IR energy detectable by a remote IR detection means;

means for selectively attracting said membrane adjacent the sample, wherein said attracting means includes electrostatic charging means positioned proximate said membrane for applying an electrostatic charge to said membrane, and a grounding circuit coupled to the sample for providing electrical conductivity to a ground node, wherein said applied charge to said membrane induces an attractive force between said membrane and the sample to thereby attract said membrane against the sample.

12. A method of remote infrared (IR) temperature measurement of a low-emissivity sample using a high-emissivity membrane, comprising the steps of:

(A) applying a force to the membrane to move the membrane adjacent to a predetermined surface area of the sample;

(B) irradiating the membrane with electromagnetic energy to heat the predetermined surface area of the sample to thereby increase a temperature of the sample in the predetermined surface area;

(C) detecting IR radiation emanating from the membrane due to the surface area temperature increase; and, (D) discontinuing the force applied in step (A) to allow separation of the membrane from the sample, wherein the membrane is supported by an enclosed shroud having an interior and an aperture, and wherein step (A) includes the substep of:

generating an airflow through the aperture into the interior onto the membrane to move the membrane into contact with the predetermined surface area.

13. The method of claim 12 wherein the membrane is supported by a gasket having an airtight interior bounded by the membrane and a passage therefrom, and wherein step (A) includes the substep of:

introducing pressurized fluid through the passage into the interior such that pressurized fluid bears against the membrane to move the membrane into contact with the predetermined surface area.

14. The method of claim 13 wherein said fluid is inert gas.

15. The method of claim 12, further including the step of placing a fluid between said sample and said membrane wherein the fluid is a selected one from the group consisting of water and ethylene glycol.

16. The method of claim 12 wherein the membrane is supported by a vacuum gasket conformable to the sample to form an airtight chamber between the membrane, an inner portion of the gasket and the sample when the gasket contacts the sample, the gasket having a passage formed therethrough in communication with the chamber, and wherein step (A) includes the substep of:

withdrawing gas from the chamber through the passage to create a vacuum in the chamber to move the membrane into contact with the predetermined surface area.

17. The method of claim 12 wherein step (A) includes the substeps of:

bringing the sample to a ground potential; and, electrostatically charging the membrane to induce an attractive force between the membrane and the sample to move the membrane into contact with the predetermined surface area.

18. An apparatus for enhancing remote infrared (IR) temperature measurement of a low-emissivity sample, comprising:

a flexible membrane having high emissivity properties of a high-emissivity material for converting thermal energy from the sample into IR energy;

an enclosed shroud coupled to said membrane at a first end for supporting said membrane, said shroud having at least four walls and an end wall disposed at a second end opposite said first end to define an interior, said end wall having an imaging window formed therethrough;

IR detection means disposed through said imaging window for detecting IR energy radiated from said membrane;

illumination means disposed in said interior and mounted to said shroud for illuminated said membrane; and, means for attracting said flexible membrane to said sample.

19. The apparatus of claim 18, wherein said attracting means includes at least one fan disposed in an aperture formed in said end wall for generating an air flow into said interior onto said membrane thereby applying a force against said membrane to move said membrane into contact with said sample.

* * * * *